United States Patent [19]
Tamai et al.

[11] Patent Number: 5,349,171
[45] Date of Patent: Sep. 20, 1994

[54] BAR CODE READER

[75] Inventors: Seiichiro Tamai, Toyono; Keiichi Kobayashi, Higashiosaka; Hideki Imai, Minoo; Takahiro Yamao, Toyonaka, all of Japan

[73] Assignee: Matsushita Electric Industrial Co., Ltd., Osaka, Japan

[21] Appl. No.: 919,906

[22] Filed: Jul. 27, 1992

[30] Foreign Application Priority Data

Jul. 26, 1991 [JP] Japan .................. 3-187357

[51] Int. Cl.$^5$ .............................. G06K 7/10
[52] U.S. Cl. ..................... 235/462; 235/463; 235/472
[58] Field of Search .............. 235/462, 463, 472

[56] References Cited

U.S. PATENT DOCUMENTS 4,096,992 6/1978 Nojiri et al. .
4,140,271 2/1979 Nojiri et al. .
4,408,120 10/1983 Hara et al. .
4,870,262 9/1989 Hasegawa .
4,902,883 2/1990 Poland .

FOREIGN PATENT DOCUMENTS 0094571 11/1983 European Pat. Off. .
0287913 10/1988 European Pat. Off. .
5-74876 10/1993 Japan .

OTHER PUBLICATIONS

"Reading Bar Codes—From Bars to Bytes", *Elektor*, vol. 7, No. 5, 5.43–5.49 (May 1981).

Primary Examiner—Harold Pitts
Attorney, Agent, or Firm—Ratner & Prestia

[57] ABSTRACT

A bar code reader has a CCD for producing an image signal, an amplifier for amplifying the image signal from the CCD and a digitalizing circuit for changing the image signal to binary signal. The CCD operates with an operating voltage Vcc less than 8 V. The amplifier has first and second operational amplifiers each having one voltage source terminal connected to Vcc of 5 V and the other voltage source terminal connected to ground. Also, the digitalizing circuit has a third operational amplifier having one voltage source terminal connected to Vcc of 5 V and the other voltage source terminal connected to ground.

9 Claims, 7 Drawing Sheets

BAR CODE READER

BACKGROUND OF THE INVENTION

1. Field of the Invention

The present invention relates to a bar code reader using an image sensor such as a CCD.

2. Description of the Prior Art

In FIG. 7, a prior art bar code reader is shown which includes a power source PS for supplying 5 V, a DC—DC converter 21 for changing the voltage from 5 V to 12 V, an image sensor 5 such as a CCD having 2048 pixels and operates at 12 V, an operational amplifier 9 for amplifying the output from the CCD 5, a digitalizing circuit 10 formed by an operational amplifier for changing the amplified signal to a digital signal, a level down circuit for changing the signal in the system having the Vcc of 12 V to the system having the Vcc of 5 V, and a microcomputer 14 for processing the read bar code signal. The microcomputer 14 includes a counter 15 for counting the width of a bar, an I/O port 16, a serial port 17, a ROM 18 and a RAM 19. By a program previously installed in the ROM 18, microcomputer 14 processes the read data and the result is applied to a buffer 20 and further transmitted to another processing device (not show).

The bar code reader further includes a light source 2 formed by LEDs aligned in an array for emitting a ribbon of light having a wavelength of 660 run, an image sensor drive circuit 12 for driving the CCD 5, and an indicator 13 formed by a buzzer or a lamp for indicating that the reading is completed.

In the prior art bar code reader, the image sensor 5 and circuits 9, 10 and 11 operates with the operating voltage Vcc of 12 V, and the circuit 2, 12 and 13 operates with the operating voltage Vcc of 5 V. The former circuit is referred to as a 12 V circuit system, and the latter is referred to as a 5 V circuit system. Since the bar code reader has only one power source, it is necessary to prepare two voltages levels, 5 V and 12 V. To this end, DC—DC converter 21 is provided in the prior art bar code reader. Furthermore, to enable the use of the signal produced in the 12 V circuit system in the 5 V circuit system, a level down circuit 11 is necessary.

When such a DC—DC converter is employed, the bar code reader becomes bulky in size, and increases the manufacturing cost. Furthermore, when a battery is used for the power source, the battery does not last long due to the use of high voltage and the power consumed in the DC—DC converter 21 and the level down circuit 11.

SUMMARY OF THE INVENTION

The present invention has been developed with a view to substantially solving the above described disadvantages and has for its essential object to provide an improved bar code reader.

In order to achieve the aforementioned object, the bar code reader according to the present invention comprises: the image sensor comprising light receiving elements which operates with an operating voltage Vcc less than 8 V; the amplifier comprising first and second operational amplifiers each having one voltage source terminal connected to Vcc of 5 V and the other voltage source terminal connected to ground; and the digitalizing circuit comprising a third operational amplifier having one voltage source terminal connected to Vcc of 5 V and the other voltage source terminal connected to ground.

Since the bar code reader of the present invention has the image sensor which operates with an operating voltage Vcc less than 8 V and the amplifier and the digitalizing circuit that can be operated with Vcc of 5 V, it is unnecessary to provide the DC—DC converter or the level down circuit as required in the prior art bar code reader. Thus, the bar code reader according to the present invention can be assembled in a compact size and cost effective.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
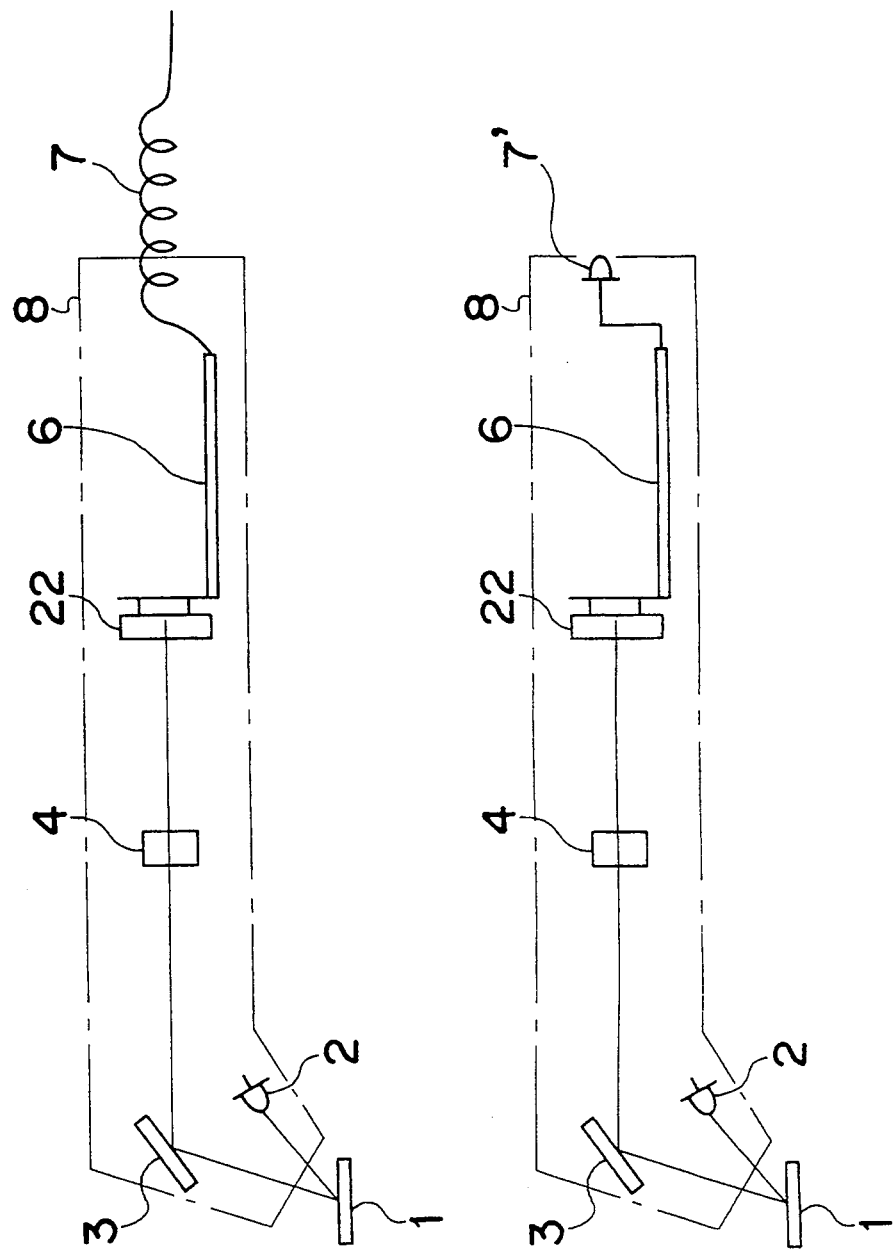
FIGS. 1a and 1b, each is a schematic view of a bar code reader of the present invention.

Referring to FIG. 1a, a bar code reader according to the present invention is shown. Provided in a casing 8 are a light source 2 formed by LEDs aligned in an array for emitting a ribbon of light having a wavelength of 660 nm, a mirror 3 for guiding light reflected from a bar code 1, an image forming lens 4, an image sensor 22 such as a CCD having 2048 pixels and operates at 5 V, a processing circuit 6, and a communication line 7 for sending data to a terminal machine, such as a POS. Instead of the communication line 7, a wireless system 7' can be used for transmitted the data, as shown in FIG. 1b. For the wireless system 7', a photodiode for generating light (infrared light) or a wave generator for generating wave having a frequency in the range of 400 MHz can be used.

Figure 2:
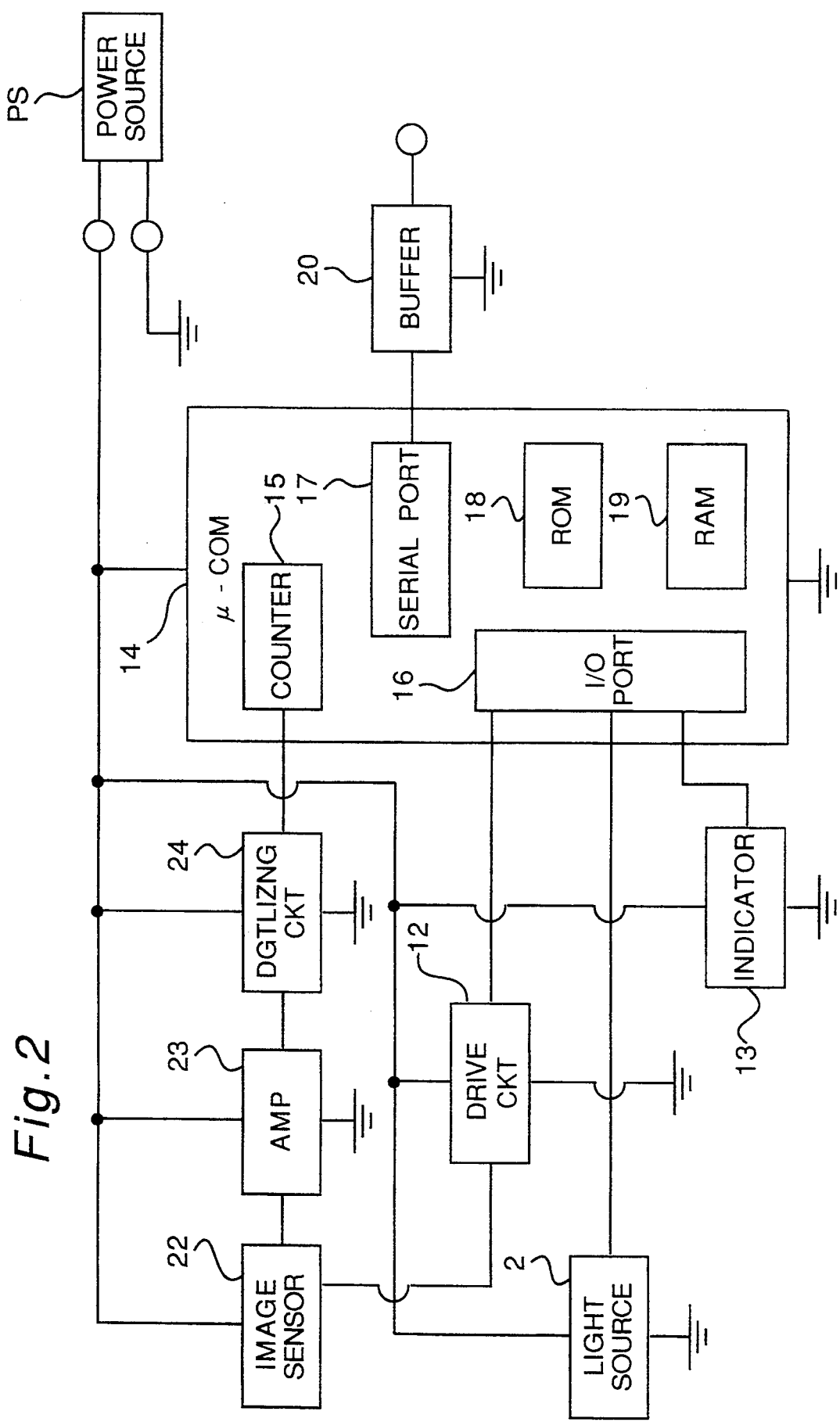
FIG. 2 is a block diagram of a bar coder reader of the present invention.

Referring to FIG. 2, the circuits mainly provided in the processing circuit 6 is shown. The circuit has a power source PS for supplying 5 V, the image sensor 22, an operational amplifier 23 for amplifying the output from the CCD 22, a digitalizing circuit 23 formed by an operational amplifier for changing the amplified signal to a digital signal, and a microcomputer 14 for processing the read bar code signal. The microcomputer 14 includes a counter 15 for counting the width of a bar, an I/O port 16, a serial port 17, a ROM 18 and a RAM 19. By a program previously installed in the ROM 18, microcomputer 14 processes the read data and the result is applied to a buffer 20 and further transmitted to another processing device (not show). From I/O port 16, shift gate pulse SH and system clocks $\phi$ are applied to the drive circuit 12 which then generates and provides first clock CK1, second clock CK2, shift gate pulse SH and reset pulse RS to image sensor 22.

The circuit further includes the light source 2, an image sensor drive circuit 12 for driving the CCD 22, and an indicator 13 formed by a buzzer or a lamp for indicating that the reading is completed.

Figure 3:
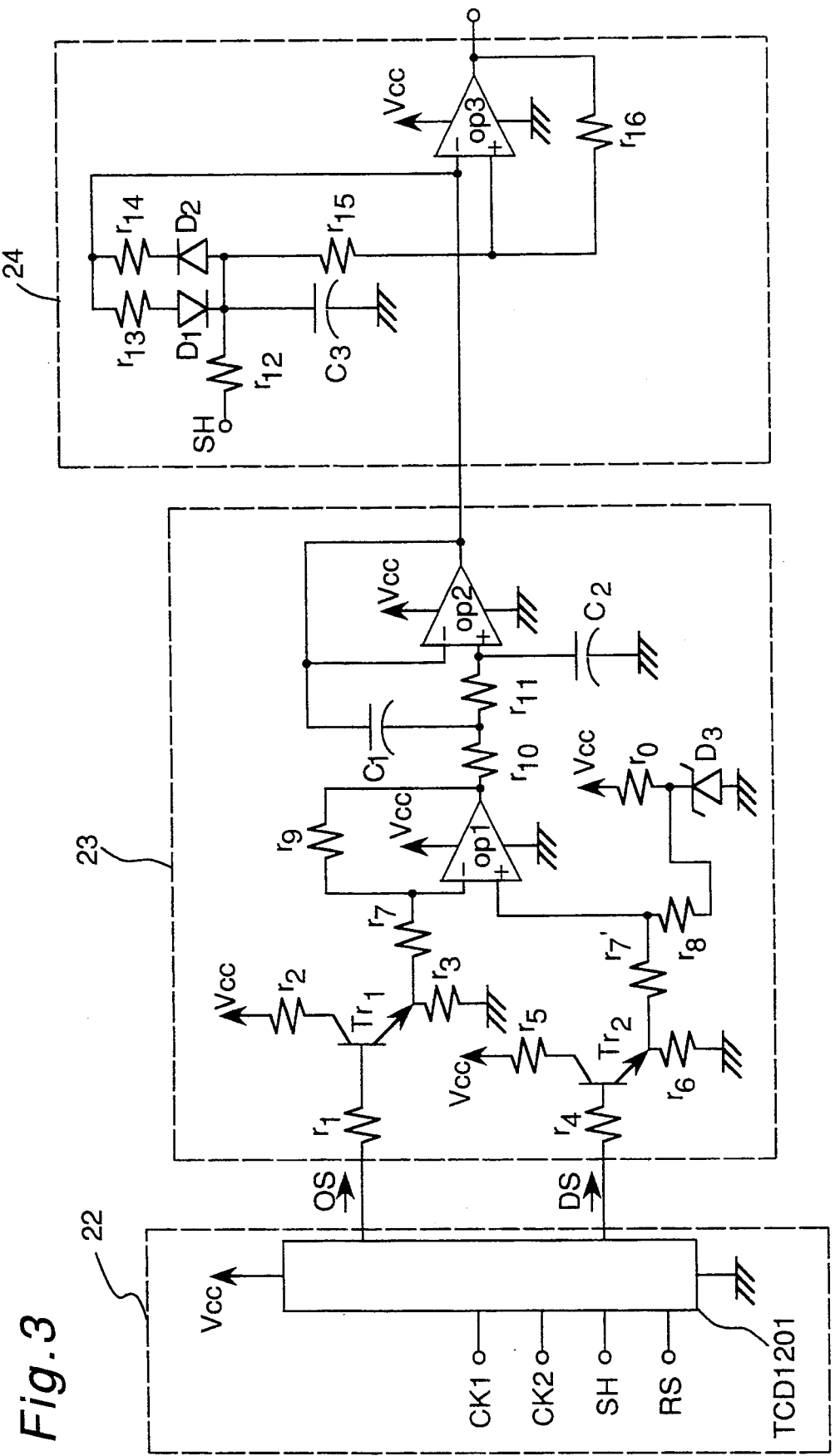
FIG. 3 is a circuit diagram of circuits 22, 23 and 24 shown in FIG. 2 according to one embodiment of the present invention.

Referring to FIG. 3, a detailed circuit diagram of the image sensor 22, amplifier 23 and digitalizing circuit 24 is shown.

Figure 4A:
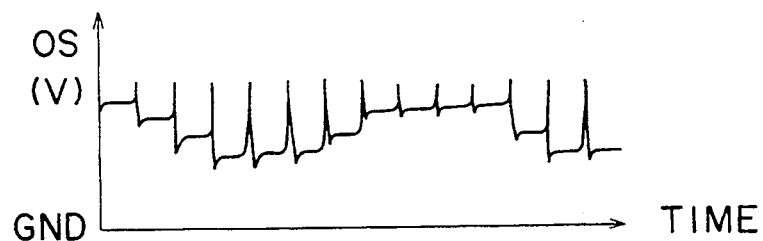
FIGS. 4a-4f are waveform diagrams showing signals processed in the circuit of FIG. 3.
Figure 4B:
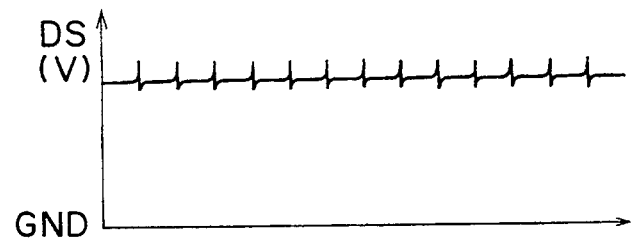

The image sensor 22 is formed by a CCD such as TCD1201 which operates with an operating voltage Vcc of 5 V. The CCD receives first clock CK1, second clock CK2, shift gate pulse SH and reset pulse RS, as in the similar manner as the CCD with the operating voltage Vcc of 12 V. When a bar code is scanned, the image sensor 22 produces an image signal OS (FIG. 4a) and a compensation signal DS (FIG. 4b).

The amplifier 23 includes a first amplifier, a second amplifier, a differential amplifier and an active filter. The first amplifier is defined by a transistor Tr1 and resistors r1, r2, r3 and r7. The second amplifier is defined by a transistor Tr2, resistors r4, r5, r6, r7', r8 and r0 and a Zener diode D3. The zener diode D3 has a voltage drop of 2.4 V and this voltage drop is used for setting the operating point of the operational amplifier op1. The transistors Tr1 and Tr2 are each arranged in an emitter follower connection. The differential amplifier is defined by an operational amplifier op1 and a resistor r9. The active filter is defined by an operational amplifier op2, resistors r10 and r11 and capacitors C1 and C2.

Figure 4C:
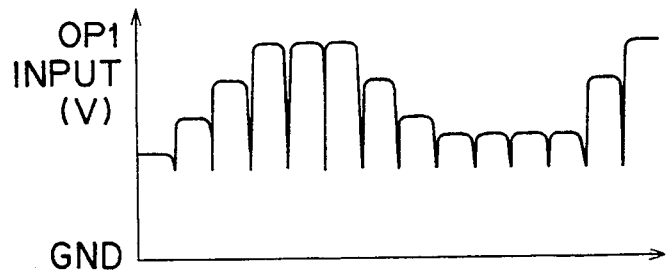
Figure 4D:
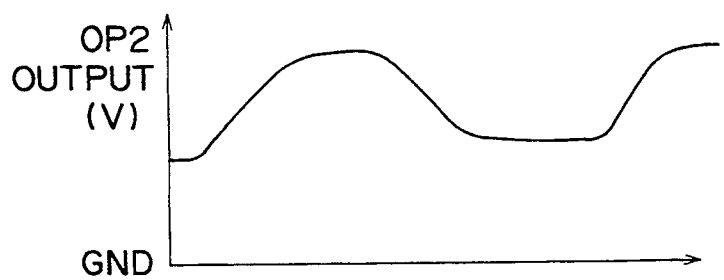

The first amplifier amplifies the image signal OS and the second amplifier amplifies the compensation signal DS. The differential amplifier receives the amplified image signal OS and the amplified compensation signal DS and produces a difference signal (FIG. 4c) representing a difference between the signals OS and DS. The active filter, serving as a low pass filter, receives the difference signal and cuts off high frequency noise signal which has a frequency greater than 300 KHz. Thus, the active filter produces a smoothed signal (FIG. 4d).

The digitalizing circuit 24 includes a peak holding circuit and a differential amplifier. The peak holding circuit is defined by a capacitor C3, resistors r12, r13, r14 and r15 and Schottky diodes D1 and D2. Schottky diodes D1 and D2 are connected parallel but in opposite directions. The differential amplifier is defined by an operational amplifier op3 and a resistor r16.

Figure 4E:
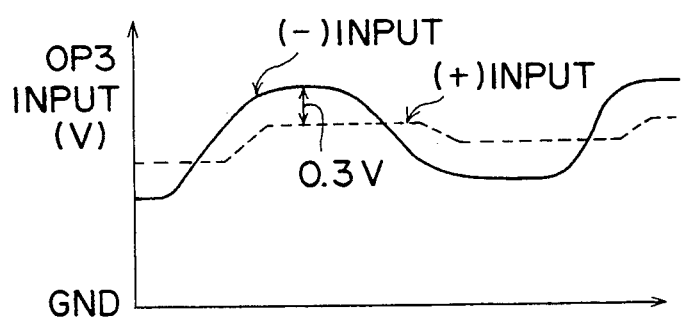
Figure 4F:
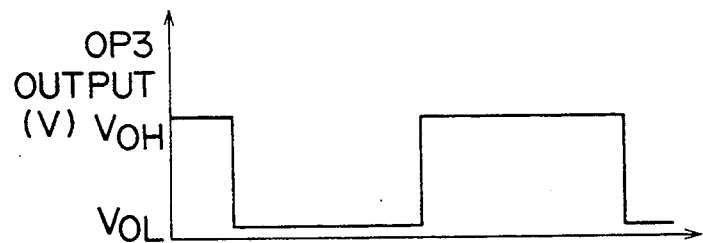

The peak holding circuit receives the shift gate pulse SH after each scanning operation by the image sensor 22 for resetting the digitalizing circuit 24 and determining the initial value. The peak holding circuit holds negative peaks and positive peaks of the smoothed signal produced from the operational amplifier op2 and produces a peak signal (FIG. 4e, dotted line) which is about 0.3 V lower or greater than the actual positive going peak point or negative going peak point, respectively. The operational amplifier op3 compares the smoothed signal and the peak signal and produces a binary signal (FIG. 4f) such that a HIGH level signal is produced when the smoothed signal is greater than the peak signal and a LOW level signal when the smoothed signal is smaller than the peak signal. By the arrangement, the digitalizing of the read signal can be done with a high accuracy such that the binary signal changes at the edges of the bars with a high preciseness.

In the circuit shown in FIG. 3, the operational amplifiers op1, op2 and op3 operate with the operating voltage Vcc of 5 V. Therefore, it is unnecessary to provide the DC—DC converter or the level down circuit as provided in the prior art bar code reader. Each of the operational amplifiers op1, op2 and op3 has one voltage source terminal connected to Vcc of 5 V and the other voltage source terminal connected to ground so that the dynamic range of the operational amplifier can be used with full operating range.

Figure 5:
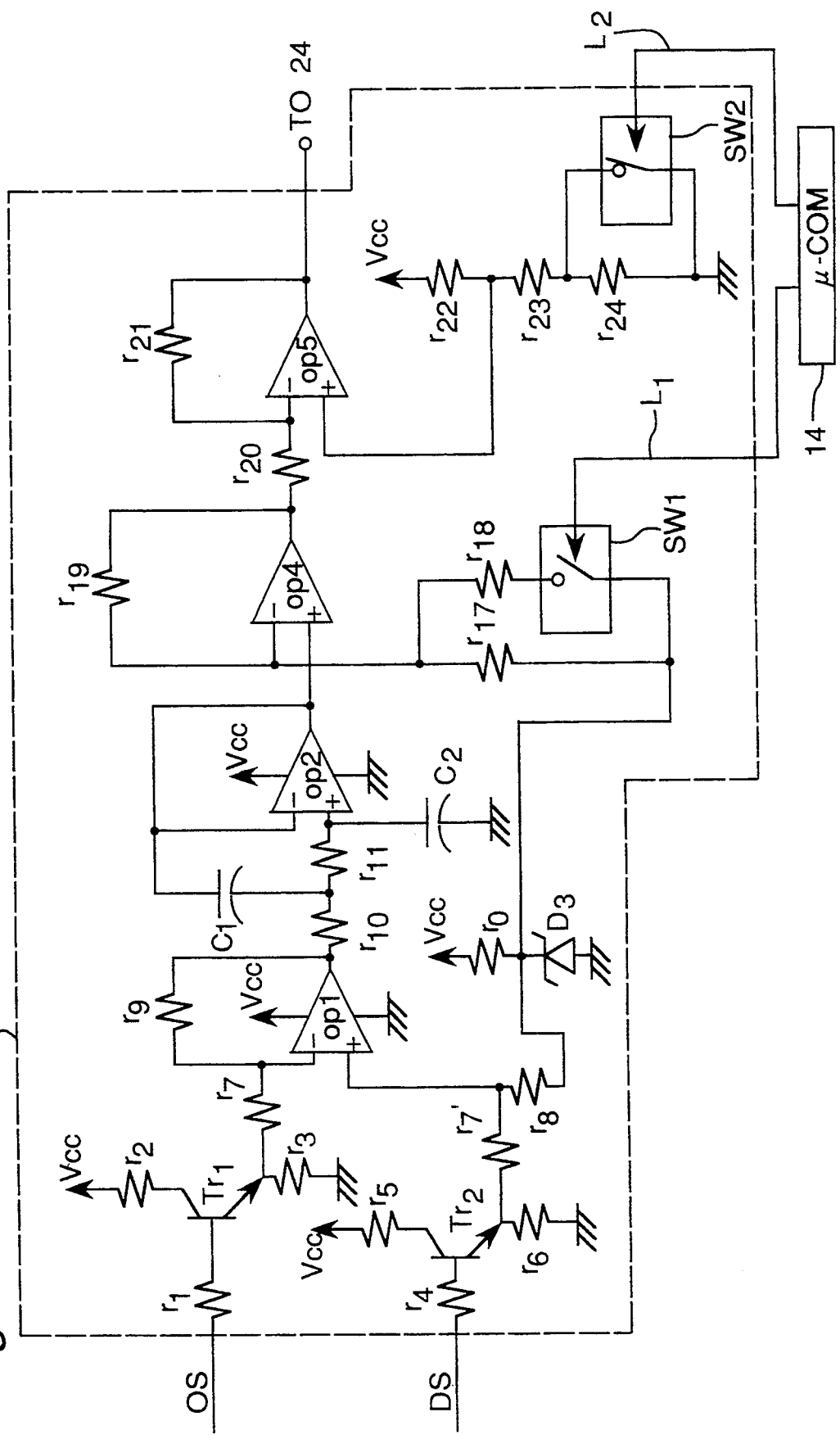
FIG. 5 is a circuit diagram of circuit 23 showing a modification thereof.

Referring to FIG. 5, a modification of the amplifier 23 is shown. In addition to the circuit elements shown in FIG. 3 for the amplifier 23, the amplifier 23 in FIG. 5 further has a amplitude control circuit and an offset level control circuit. The amplitude control circuit is defined by an operational amplifier op4, resistors r17, r18 and r19 and an analog switch SW1 controlled by microcomputer 14. The analog switch SW1 is a normally open switch. The offset level control circuit is defined by an operational amplifier op5 resistors r20, r21, r22, r23 and r24 and an analog switch SW2. The analog switch SW2 is a normally close switch.

Figure 6A:
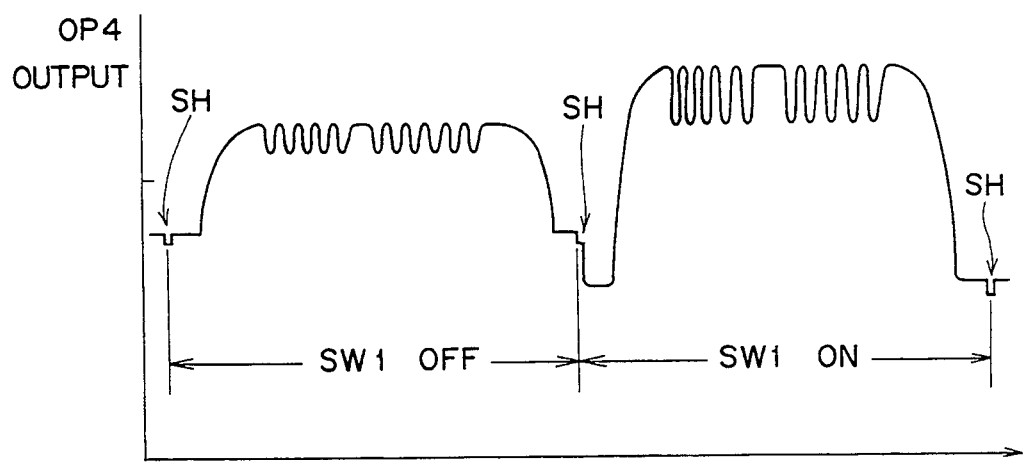
FIGS. 6a and 6b, each is a waveform diagram showing signals processed in the circuit of FIG. 5.

While decoding the digital signal representing the bar code in the microcomputer 14, if a decode error caused by a small amplitude of the bar code detection signal, such as shown in FIG. 6a, left-hand side, is detected, microcomputer 14 produces an ON signal along line L1 to turn switch SW1 on. Thus, a resistor r18 is connected parallel to resistor r17 to increase the amplification rate of operational amplifier op4. Thus, the bar code detection signal from operational amplifier op4 shows greater amplification, as shown in FIG. 6a, right-hand side.

Figure 6B:
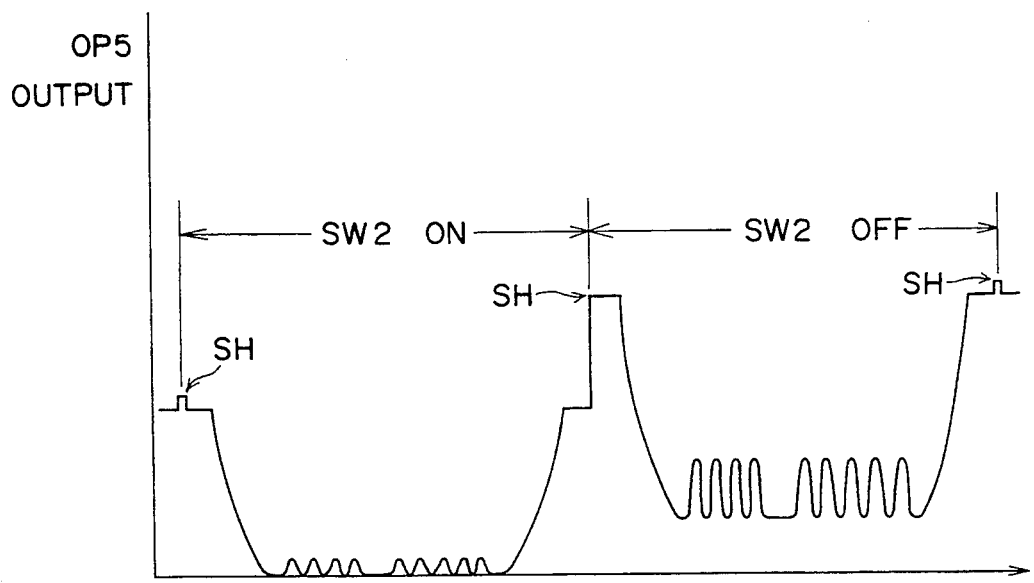
Figure 7:
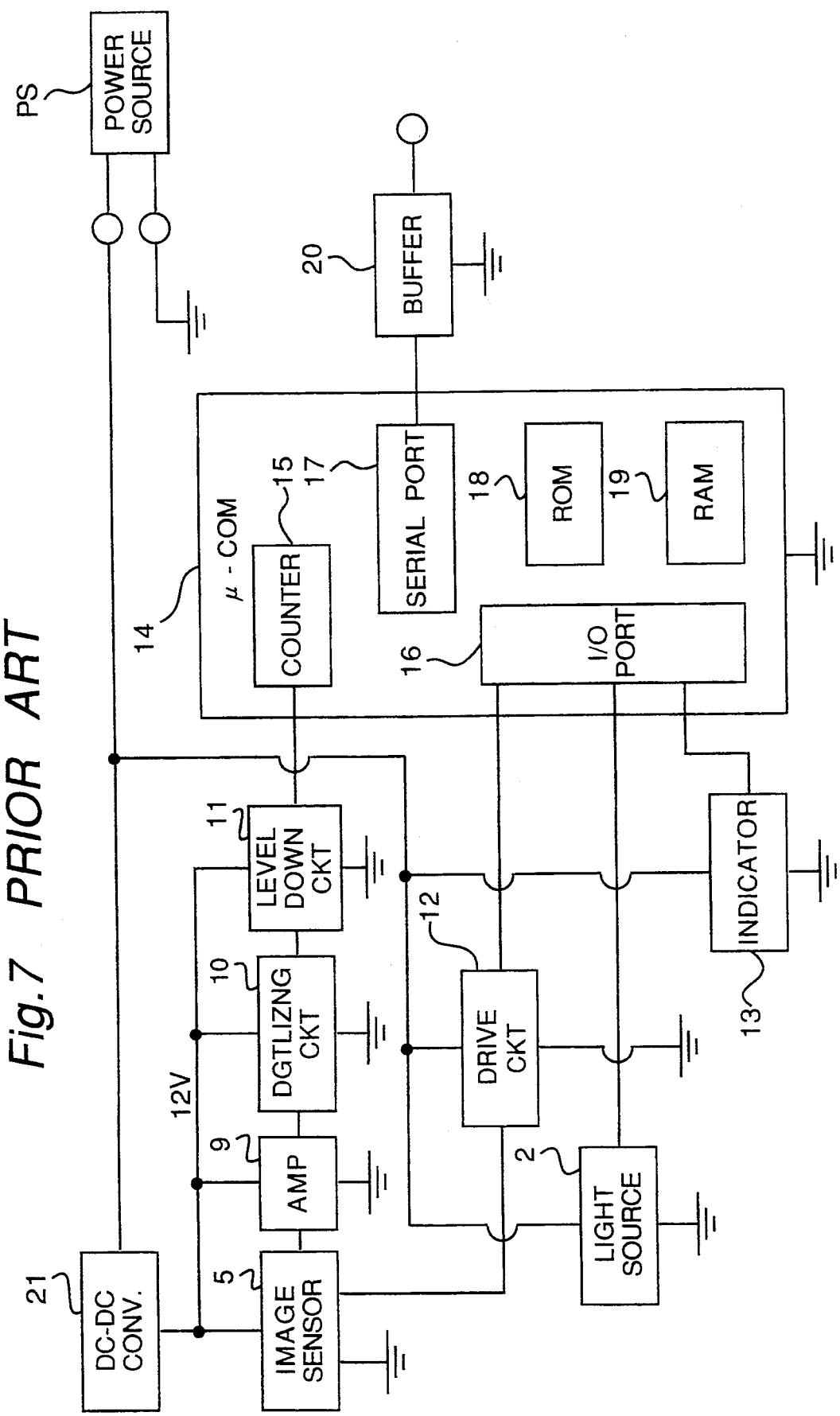
FIG. 7 is a block diagram of a prior art bar code reader.

While decoding the digital signal representing the bar code in the microcomputer 14, if a decode error caused a saturation of the bar code detection signal, such as shown in FIG. 6b, left-hand side, is detected, microcomputer 14 produces an OFF signal along line L2 to turn switch SW1 off. This may happen when the contract between the bars and spaces is relatively low. Thus, a resistor r24 is connected in series to resistor r23 to shift the operating point of the operational amplifier op5. Thus, the bar code detection signal from operational amplifier op5 is shifted within the saturation range, as shown in FIG. 6b, right-hand side.

The ON and OFF signals from line L1 or L2 are produced in response to the shift gate pulse SH so that ON condition or OFF condition is maintained at least for one cycle between two shift gate pulses.

In the example shown in FIG. 5, only one analog switch SW1 is provided for controlling the amplification rate, but a plurality of analog switches can be provided to change the amplification rate in a plurality of different steps.

Similarly, a plurality of analog switches for switch SW2 can be provided to change the offset level in a plurality of different levels.

In the embodiment described above, the CCD having 2048 pixels arranged in a linear array (one dimension alignment) with operating voltage range of 4.5 to 5.5 V is employed in the image sensor 22, so as to satisfy a condition that the maximum rated operating voltage of the image sensor 22 is less than 8 V. It is possible to further reduce the operating voltage. For example, it is possible to employ a CCD which has the operating voltage of 3 V. Also, the pixel alignment in the CCD can be arranged in two dimensions instead of one dimension.

Furthermore, for the power source, it is possible to use a dry battery or a rechargeable battery. For the communication line 7, it is possible to use a wireless communication system, using light (infrared light) or a wave having a frequency in the range of 400 MHz.

According to the present invention, since all the circuits including the image sensor 22 has the operating voltage Vcc of 5 V, it is possible to assemble the bar code reader in a compact size, and yet the operation reliability can be improved. Also the bar code reader can be manufactured cost effective.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a bar code reader having a light source for lighting the bar code, an image sensor for receiving the reflected light from the bar code and producing an image signal, a drive circuit for driving the image sensor, an amplifier for amplifying the image signal, and a digitalizing circuit for digitalizing the amplified image signal and producing a digital signal representing the bar code, an improvement comprising:

said image sensor comprising light receiving elements formed in a CCD array which operates with an operating voltage (Vcc) less than 8 V;

said amplifier comprising first and second operational amplifiers each having one voltage source terminal connected to Vcc of 5 V and the other voltage source terminal connected to ground; and said digitalizing circuit comprising a third operational amplifier having one voltage source terminal connected to Vcc of 5 V and the other voltage source terminal connected to ground.

2. In a bar code reader having a light source for lighting the bar code, an image sensor for receiving the reflected light from the bar code and producing an image signal, a drive circuit for driving the image sensor, an amplifier for amplifying the image signal, and a digitalizing circuit for digitalizing the amplified image signal and producing a digital signal representing the bar code, an improvement comprising:

said image sensor comprising light receiving elements formed in a CCD array which operates with an operating voltage Vcc less than 8 V;

said amplifier comprising first and second operational amplifiers each having one voltage source terminal connected to Vcc of 5 V and the other voltage source terminal connected to ground;

said digitalizing circuit comprising a third operational amplifier having one voltage source terminal connected to Vcc of 5 V and the other voltage source terminal connected to ground; and amplitude control means for controlling the amplitude of the amplified image signal, said amplitude control means comprising (i) a fourth operational amplifier coupled to said amplifier, and (ii) means to which said fourth operational amplifier is coupled for changing an amplification rate of said fourth operational amplifier as a function of a bar code detection signal.

3. A bar code reader as claimed in claim 1, wherein said digitalizing circuit is reset after each scanning operation of said image sensor.

4. A bar code reader as claimed in claim 1, further comprising an amplitude control means for controlling the amplitude of the signal produced from said amplifier.

5. A bar code reader as claimed in claim 1, further comprising an offset level control means for controlling the offset level of the signal produced from said amplifier.

6. A bar code reader as claimed in claim 1, further comprising a processor for decoding the digital signal.

7. A bar code reader as claimed in claim 6, further comprising a data communication system for transmitting the decoded digital signal.

8. A bar code reader as claimed in claim 7, wherein said data communication system is a wireless system comprising a photodiode.

9. A bar code reader as claimed in claim 7, wherein said data communication system is a wireless system comprising a wave generator.

* * * * *